(12) United States Patent
Rysavy

(10) Patent No.: US 8,408,847 B2
(45) Date of Patent: Apr. 2, 2013

(54) CUTTING INSERT AND CUTTING TOOL

(75) Inventor: Jaromir Rysavy, Sumperk (CZ)

(73) Assignee: Pramet Tools, s.r.o., Sumperk (CZ)

( * ) Notice: Subject to any disclaimer, the term of this patent is extended or adjusted under 35 U.S.C. 154(b) by 1181 days.

(21) Appl. No.: 11/745,555

(22) Filed: May 8, 2007

(65) Prior Publication Data

US 2007/0286692 A1 Dec. 13, 2007

(51) Int. Cl.
B23C 5/02 (2006.01)

(52) U.S. Cl. .................. 407/104; 407/113; 407/114

(58) Field of Classification Search ............ 407/101, 407/104, 107, 113, 114, 102
See application file for complete search history.

(56) References Cited

U.S. PATENT DOCUMENTS

| | | | |
|---|---|---|---|
| 3,341,921 A * | 9/1967 | Weller et. al. ............. | 407/104 |
| 3,341,923 A | 9/1967 | Kelm | |
| 3,525,136 A * | 8/1970 | Crosby ..................... | 407/105 |
| 3,662,444 A * | 5/1972 | Erkfritz .................... | 407/41 |
| 3,708,843 A * | 1/1973 | Erkfritz .................... | 407/38 |
| 4,283,163 A * | 8/1981 | Grafe et al. ............... | 407/104 |
| 5,244,318 A * | 9/1993 | Arai et al. ................. | 407/42 |
| 5,836,724 A * | 11/1998 | Satran et al. .............. | 407/104 |
| 7,021,871 B2 * | 4/2006 | Arvidsson et al. ......... | 407/113 |
| 2003/0042092 A1 * | 3/2003 | Wang ....................... | 190/115 |

FOREIGN PATENT DOCUMENTS

| | | | |
|---|---|---|---|
| DE | 1126701 B | * | 3/1962 |
| GB | 1389099 A | | 4/1975 |
| JP | 2003145320 A | | 5/2003 |
| WO | 03022495 A | | 3/2003 |
| WO | 2004101236 A | | 11/2004 |
| WO | 2005068116 A | | 7/2005 |

OTHER PUBLICATIONS

"Curvature." Encyclopædia Britannica. 2010. Encyclopædia Britannica [Online],[retrieved on Apr. 7, 2010]. Retreived from the internet <URL: http://www.britannica.com/EBchecked/topic/147229/curvature>.*
International Search Report for corresponding International Application PCT/EP2007/053957.

* cited by examiner

*Primary Examiner* — Kenneth E. Peterson
*Assistant Examiner* — Jennifer Swinney
(74) *Attorney, Agent, or Firm* — WRB-IP LLP

(57) ABSTRACT

The present invention relates to cutting tools and, more particularly, to cutting tools using clampable cutting inserts. The cutting tool includes a toolholder including at least one insert-receiving pocket, the insert-receiving pocket including at least one side abutment surface. The cutting tool further includes a cutting insert comprising an insert body having at least one insert supporting surface and a clamping hole including a clamping surface defining at least part of a non-circular, substantially elliptical cone. The cutting tool further includes a clamp having a clamp surface adapted to contact the clamping surface at two contact points such that the at least one side abutment surface and the at least one insert supporting surface are secured in a contacting relationship.

11 Claims, 4 Drawing Sheets

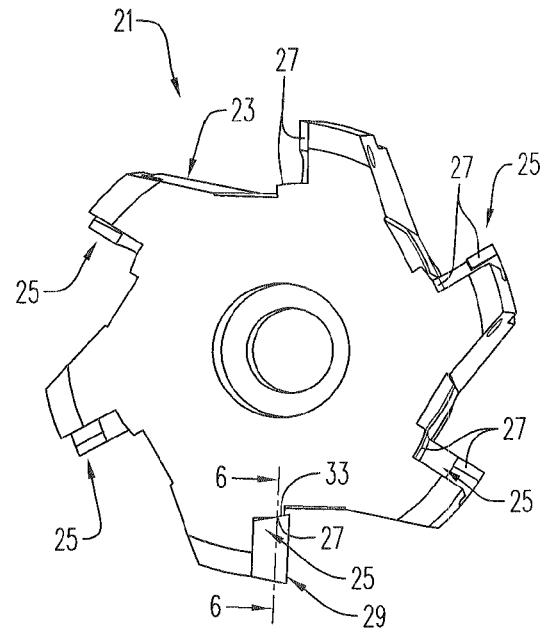
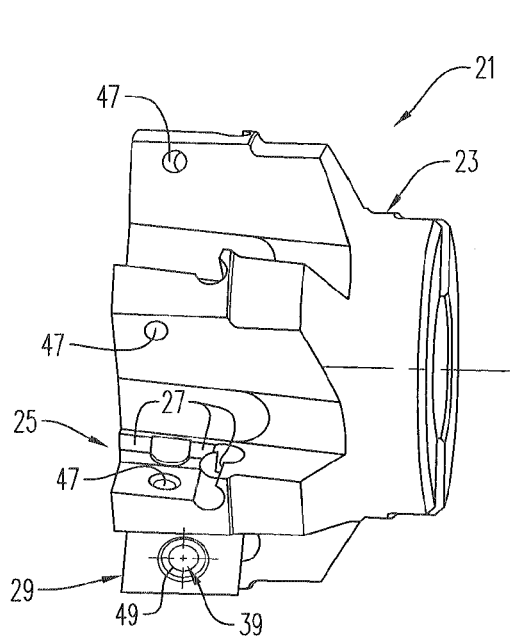
FIG. 1B    FIG. 1A
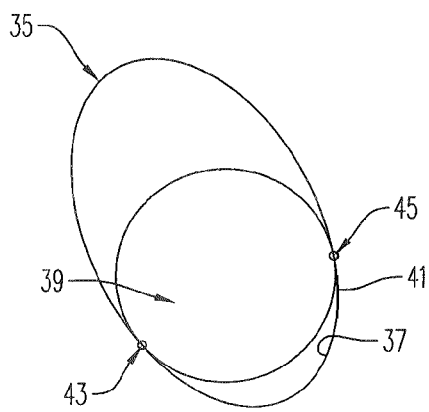
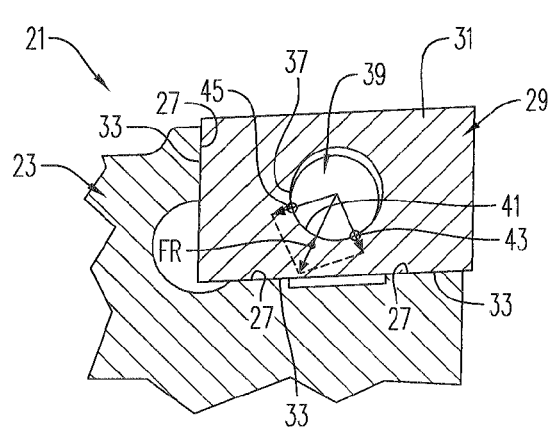
FIG. 7    FIG. 6

CUTTING INSERT AND CUTTING TOOL

BACKGROUND AND SUMMARY

The present invention relates to cutting tools and, more particularly, to cutting tools using clampable cutting inserts.

In various forms of cutting tools, such as rotating tools and turning tools, it is known to clamp replaceable cutting inserts in pockets on toolholders. Using replaceable, clampable cutting inserts instead of, e.g., cutting inserts that are brazed to a toolholder facilitates replacement of the inserts when worn. Often, the cutting inserts are indexable to a plurality of positions to replace worn portions of a cutting edge of the insert with a sharp portion. A variety of techniques for clamping the replaceable inserts to the toolholder are known, and include pin arrangements, screw or bolt arrangements, and clamping arm arrangements.

Whatever clamping arrangement is used to clamp the insert relative to the toolholder, it is highly desirable that the insert be securely clamped and that any capacity of the insert to move during use is minimized. It is also desirable that the manner of clamping the insert relative to the toolholder be simple to facilitate replacement or indexing of the insert. It is also desirable that the clamping arrangement facilitate precise mounting of the insert relative to the toolholder so that a working cutting edge of the insert will be located in a precise location relative to the toolholder to facilitate automated machining.

Various measures to ensure secure clamping, simple removal or indexing, and precise locating of an insert relative to a toolholder are known. For example, occasionally, the insert supporting surface of the insert will have a slight outward bowing or the insert abutment surface of the pocket of the toolholder will be imperfectly flat so that there is only a single point, line, or area of contact (collectively hereinafter referred to generically as a point of contact) between the two surfaces. Application of high forces to the insert, such as during a machining operation, can cause even a very tightly clamped insert to pivot ever so slightly about that point, line, or area of contact. Such pivoting causes the cutting edge of the insert to move relative to the toolholder and can result in damage to a workpiece or adversely affect the precision to which the workpiece can be machined.

To minimize any tendency of the insert to move relative to a toolholder during use, an insert abutment surface of the insert-receiving pocket of the toolholder might be provided with a recess so that contact between two points of the insert abutment surface and the insert's insert supporting surface can be ensured. By providing a recess in the insert abutment surface or the insert supporting surface, even if an insert supporting surface or an insert abutment surface is less than perfectly flat, there will be two points of contact between the two surfaces, which reduces a tendency of the insert to rock relative to the toolholder.

Typically, inserts have holes for receiving a clamping screw, pin, or clamping arm portion that tends to urge the insert supporting surface(s) against the insert abutment surface(s). It is also known to attempt to minimize a tendency of the insert to move relative to the toolholder by providing a clamping surface on the insert that will contact a clamp surface at least at two points. This is typically accomplished by providing a polygonal clamping surface in the insert for contacting a circular clamping surface of a screw, pin, or arm. U.S. Pat. No. 3,341,921, which is incorporated by reference, discloses such an arrangement. It is desirable to provide a simple arrangement for minimizing any tendency of an insert to pivot relative to a clamping structure.

In accordance with an aspect of the present invention, a cutting insert comprises an insert body having a clamping hole including a clamping surface defining at least part of a non-circular, substantially elliptical cone.

In accordance with another aspect of the present invention, a cutting tool comprises a toolholder comprising at least one insert-receiving pocket, the insert-receiving pocket including at least one side abutment surface, a cutting insert comprising an insert body having at least one insert supporting surface and a clamping hole including a clamping surface defining at least part of a non-circular, substantially elliptical cone, and a clamp having a clamp surface adapted to contact the clamping surface at two contact points such that the at least one side abutment surface and the at least one insert supporting surface are secured in a contacting relationship.

BRIEF DESCRIPTION OF THE DRAWINGS

The features and advantages of the present invention are well understood by reading the following detailed description in conjunction with the drawings in which like numerals indicate similar elements and in which:

FIGS. 1A and 1B are bottom and side perspective views, respectively, of a cutting tool according to an embodiment of the present invention;

FIG. 6 is a cross-sectional view through section 6-6 of a portion of the cutting tool of FIG. 1A;

FIG. 7 is a schematic view showing contact between a clamp surface of a clamp and a clamping surface of an insert according to an embodiment of the present invention.

DETAILED DESCRIPTION

Figure 2:
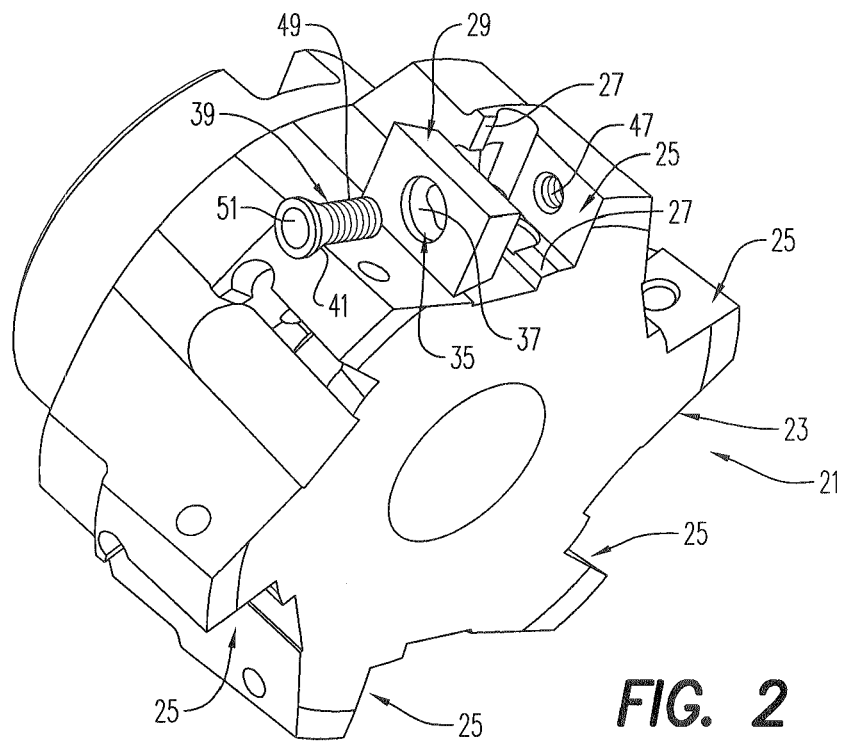
FIG. 2 is a bottom perspective, partially exploded view of a cutting tool according to an embodiment of the present invention.

A cutting tool 21 according to an embodiment of the present invention is shown in FIGS. 1A-1B, 2, 6, and 8. The illustrated cutting tool 21 is a milling tool, however, aspects of the present invention are considered to have application to all types of cutting tools that include replaceable cutting inserts, including milling, drilling, boring, and turning tools. The cutting tool 21 comprises a toolholder 23 comprising at least one insert-receiving pocket 25 that includes at least one side abutment surface 27. Often, cutting tools 21 such as the illustrated milling tool will include a plurality of insert-receiving pockets 25.

The cutting tool 21 also includes a cutting insert 29 receivable in an insert-receiving pocket 25. As seen in FIGS. 3A-3E and 4, the cutting insert 29 comprises an insert body 31 having at least one insert supporting surface 33 (FIGS. 1A and 8) and a clamping hole 35 including a clamping surface 37 defining at least part of a non-circular, substantially elliptical cone, or truncated cone. The insert body 31 is preferably comprised of a hard substance (for example tungsten carbide, WC) and binder (for example cobalt, Co). The insert body 31 may be coated with layers of for example Al2O3, TiN and/or TiCN.

Figure 5:
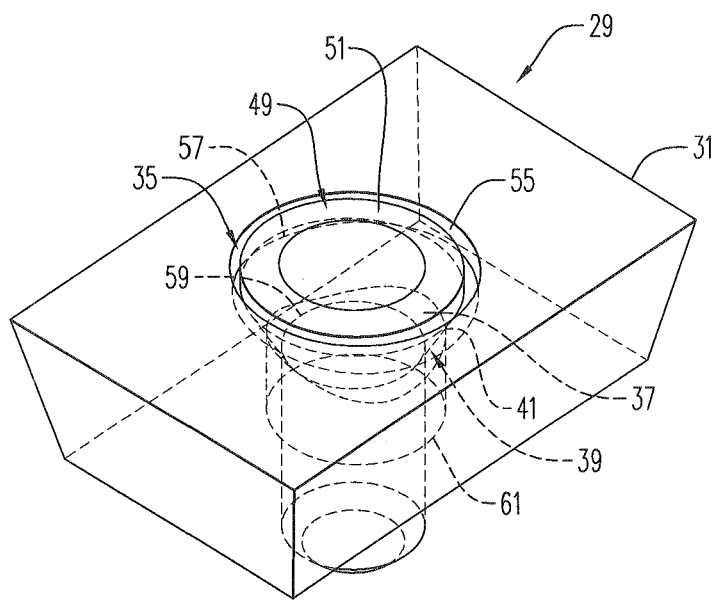
FIG. 5 is a perspective view of a cutting insert and clamp according to an embodiment of the present invention.

The cutting tool 21 also includes a clamp 39 having a clamp surface 41 as seen in FIGS. 2, 5 (in phantom), 6, 7, and 8 adapted to contact the clamping surface 37 at least at two contact points 43 and 45 (FIGS. 6 and 7) such that the at least one side abutment surface 27 and the at least one insert supporting surface 33 are secured in a contacting relationship. Contact between the at least two contact points 43 and 45 and the clamping surface 37 will ordinarily be arranged such that a resultant force FR (FIG. 6) of the forces applied at the at least two contact points will urge the insert supporting surface 33 of the insert 29 against the insert abutment surface 27 of the pocket 25. The clamp surface 41 will typically be circular in cross-section when it forms part of a head of a clamping screw. The clamp surface 41 may be non-circular but must be of a shape that will differ sufficiently from the shape of the clamping surface such that at least two points of contact 43 and 45 are formed when the surfaces abut.

The clamping surface 37 may be part of a larger surface that is not a non-circular, substantially elliptical cone, however, the clamping surface itself shall be considered a portion of any larger surface where the portion is intended to be contacted by the clamp surface 41, and where the clamping surface has the form of a non-circular, substantially elliptical cone or truncated cone. For purposes of the present application, except where otherwise indicated, an "elliptical cone" shall be defined to cover shapes that are elliptical as well as other rounded shapes, such as ovals, that are not ellipses in the mathematical sense, and shall be defined as excluding shapes that are circular, even though, technically, a circle is a form of ellipse. The precise form of the surfaces is not as important as the possibility of having at least two discrete points of contact between the clamping surface 37 and the (usually circular) clamp surface 41. The at least two contact points 43 and 45 reduce the possibility of movement of the insert 29 relative to the clamp 39 as compared to clamping arrangements having only a single point of contact.

In the illustrated embodiments, the clamping hole 35 extends through the insert body 31, and the insert-receiving pocket 25 includes an internally threaded hole 47 for receiving a threaded clamping screw 49. A head 51 of the clamping screw 49, more specifically, the underside of the head of the clamping screw, defines the clamp surface 41. The underside of the clamping screw head 51 can have any suitable shape, but will ordinarily be in the form of a substantially truncated cone shape, a substantially spherical shape (shown in phantom in FIG. 8), or some shape between conical and spherical.

Figure 8:
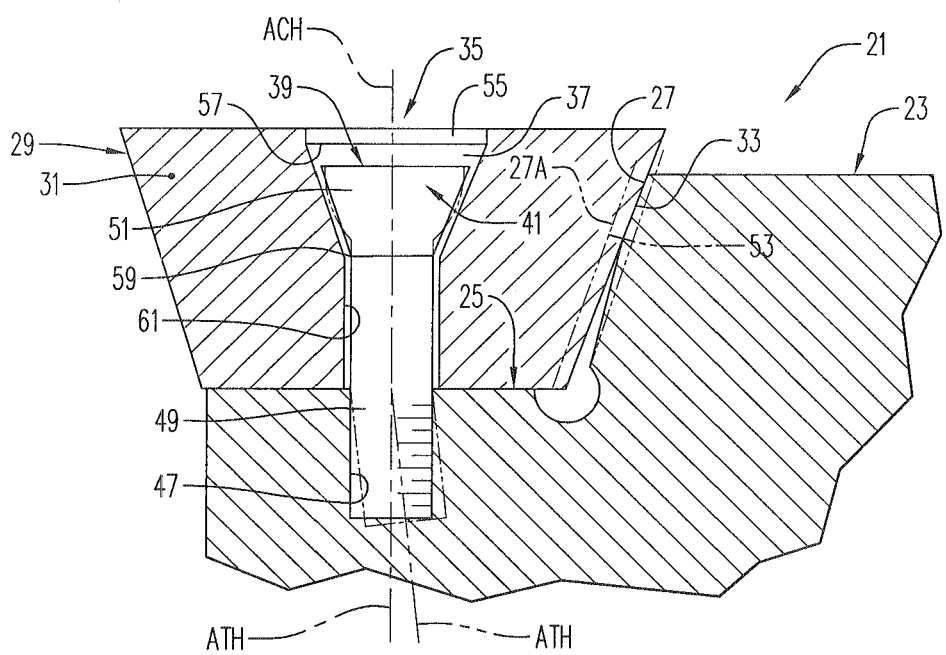
FIG. 8 is a cross-sectional, schematic view of a portion of a cutting tool according to an embodiment of the present invention.

An axis ATH of the internally threaded hole 25 will ordinarily be substantially parallel and aligned with an axis ACH of the clamping hole 35 when the at least one side abutment surface 27 and the at least one insert supporting surface 33 are secured in the contacting relationship as seen in FIG. 8, however, as shown in phantom in FIG. 8, they may be non-parallel and define an angle relative to each other, such as disclosed in U.S. Pat. No. 3,662,444, U.S. Pat. No. 5,199,828, or U.S. Pat. No. 6,579,042, which are incorporated by reference.

The clamp 39 is adapted to move to a clamping position relative to the toolholder 23 and the cutting insert 29 in which clamping forces at the two contact points 43 and 45 urge the at least one insert supporting surface 33 of the cutting insert against the at least one insert abutment surface 27 of the insert-receiving pocket 25. Particularly for polygonal inserts, as seen in FIGS. 1A, 1B, and 2, the insert-receiving pocket 25 will typically include at least two insert abutment surfaces 27. The cutting insert 29 will typically include at least two insert supporting surfaces 33, and the clamping forces at the two contact points 43 and 45 will urge the at least two insert supporting surfaces against the at least two insert abutment surfaces.

The at least one insert abutment surface 27 and the at least one insert supporting surface 33 typically define non-zero angles with an axis ACH of the clamping hole 35 when the at least one side abutment surface and the at least one insert supporting surface are secured in a contacting relationship. The angles formed by the abutment surface 27 and the insert supporting surface 33 are typically the same as each other, or close to the same as each other, such that, as the (usually circular) clamp surface 41 of the clamp 39 moves downward to the clamping position along the generally conical elliptical surface of the clamping surface 37 of the clamping hole 35, a camming action of the contact points 43 and 45 urges the insert supporting surface(s) toward and into contact with respective abutment surface(s). It will be appreciated, however, that the present invention has application with inserts with insert supporting surfaces that are parallel to the axis of the clamping hole 35, such as where the insert is indexable by being turned upside down.

For example, if the angle of the insert supporting surface 33 with the axis ACH of the clamping hole 35 is less than the angle of the abutment surface 27 with the axis ACH, and if the insert supporting surface extends above the abutment surface, it is possible to predict with substantial accuracy that contact between the insert supporting surface 33 and the abutment surface 27 will occur at the top of the abutment surface, thereby facilitating ensuring that the cutting edge(s) of the insert 29 will be properly located relative to the toolholder 23. As seen in FIG. 8, the insert abutment surface 27 is substantially parallel with the insert supporting surface 33 for a certain distance so that contact can occur over a predefined area of the surfaces. This reduces the amount of area of the insert and the pocket that must be formed to meet precise tolerances. In addition, this arrangement tends to distribute forces between the insert supporting surface and the insert abutment surface over a larger area than when contact between the insert abutment surface and the insert supporting surface occurs primarily at a top of the insert abutment surface, such as is shown in phantom in FIG. 8 where the insert abutment surface 27A and the insert supporting surface 33 define different angles relative to each other over their entire height, although such an arrangement is not excluded by the present invention. Other techniques for ensuring or enhancing accuracy of the position of the insert 29 relative to the toolholder 23 are known and the invention is not to be considered to be limited to any particular technique.

To further facilitate ensuring proper seating of the insert 29 relative to the toolholder 25, as disclosed in U.S. Pat. No. 5,421,679, which is incorporated by reference, at least one of the at least one of the insert supporting surface 33 and the at least one the side abutment surface 25 can include a recess 53 (shown in phantom in FIG. 8) formed therein such that the at least one insert supporting surface and the at least one side abutment surface contact each other at least at two discrete points when in the contacting relationship.

Figure 3A:
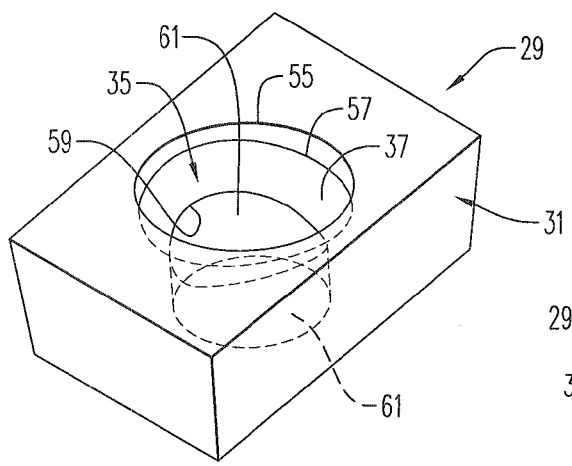
FIGS. 3A-3E are a top perspective view, a top plan view, a side cross-sectional view, a cross-sectional view through section 3D-3D of FIG. 3C, and a cross-sectional view through section 3E-3E of FIG. 3C of a cutting insert according to an embodiment of the present invention.
Figure 3D:
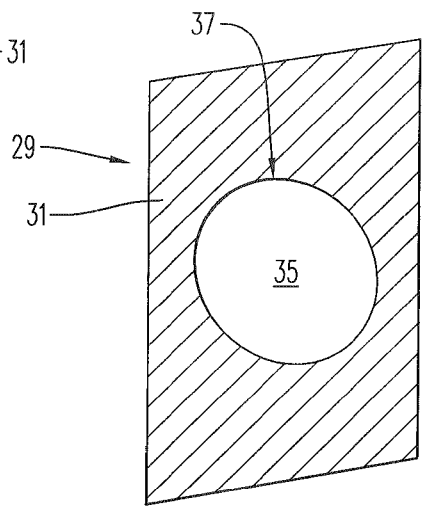
Figure 3C:
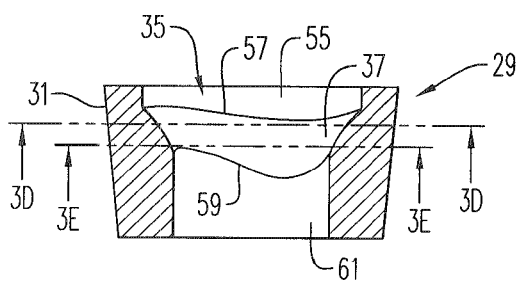
Figure 3B:
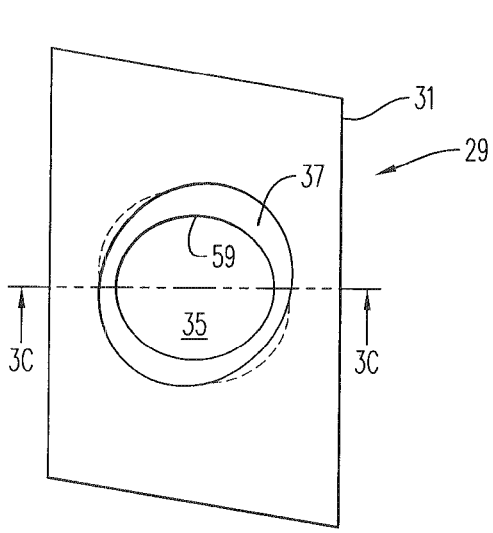
Figure 3E:
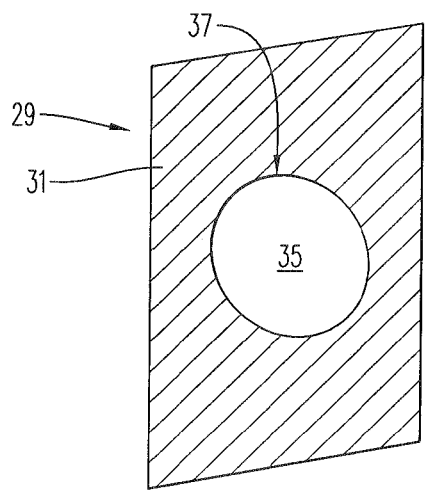
Figure 4:
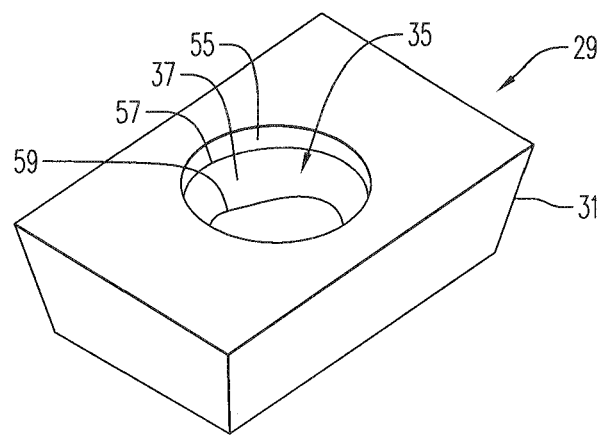
FIG. 4 is a perspective view of a cutting insert according to an embodiment of the present invention.

As seen in FIG. 3B, the insert's 29 clamping surface 37 can define an elliptical cone (ordinarily a truncated elliptical cone) or, as shown in phantom in FIG. 3B, part of an elliptical cone such as part of two or more superimposed truncated elliptical cones, and the like. The insert 29 may be of any desired shape, such as a polygonal or circular shape when viewed along the axis ACH of the clamping hole 3539. FIG. 8 shows an insert 29 in cross-section that can be polygonal or circular.

While the insert 29 has been described in connection with embodiments wherein the clamping hole 35 extends entirely through the insert body 33, the clamping hole can be formed to extend only partially through the insert body. Instead of securing the insert 29 with a clamp 39 in the form of a screw or bolt, the clamp can be in some other known form, such as in the form of a clamping arm (not shown) that is secured to or integral with the toolholder and secures an insert relative to a pocket or recess for the insert in the toolholder. Embodiments of toolholders with various forms of clamping arms are disclosed in, for example, U.S. Pat. Nos. 6,702,528, 6,244,790, and 6,168,357, which are incorporated by reference.

The cutting insert 29 can have a clamping hole 35 that, in addition to the clamping surface 37 having the form of an elliptical cone, can include a substantially cylindrical surface 55. The substantially cylindrical surface 55 will ordinarily be disposed vertically above the clamping surface 37 and may be useful for, among other things, ensuring that the head 51 of the screw 49 is disposed below a top end of the clamping hole 35. The clamping surface 37 and the cylindrical surface 55 will ordinarily intersect, however, some other surface, such as a curved or semi-spherical surface may be disposed between the surfaces.

The clamping surface 37 ordinarily has two ends, i.e., an upper end 57 and a lower end 59. The cylindrical surface 55 can be disposed proximate one end, e.g., the upper end 57, of the clamping surface 37, and the end 59 of the clamping surface opposite the cylindrical surface, i.e., the lower end 59, can intersect with a second substantially cylindrical surface 61.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The disclosures in Swedish patent application No. 0601152-2, from which this application claims priority are incorporated herein by reference.

While this invention has been illustrated and described in accordance with a preferred embodiment, it is recognized that variations and changes may be made therein without departing from the invention as set forth in the claims.

What is claimed is:

1. A cutting tool comprising a toolholder comprising at least one insert-receiving pocket, the insert-receiving pocket including at least two side abutment surfaces, wherein the cutting tool comprises a cutting insert comprising an insert body having a top surface, a bottom surface, a plurality of side insert supporting surfaces between the top surface and the bottom surface, and a clamping hole including a clamping surface defining at least part of a non-circular, elliptical cone, and a clamp having a clamp surface that is circular in a cross-section taken perpendicular to a longitudinal axis of the clamp surface and is adapted to contact the clamping surface at only two clamp contact points defining outer edges of at least one area of contact between the clamping surface and the clamp such that the two side abutment surfaces and two non-parallel insert supporting surfaces of the plurality of insert supporting surfaces are secured in a contacting relationship, wherein the outer edges of the at least one area of contact are arranged relative to the two non-parallel insert supporting surfaces of the insert supporting surfaces so that components of a force applied to at least the two clamp contact points of the at least one area of contact are adapted to be transmitted simultaneously to the two side abutment surfaces through the two non-parallel insert supporting surfaces of the insert supporting surfaces.

2. The cutting tool as set forth in claim 1, wherein the clamping hole extends through the insert body.

3. The cutting tool as set forth in claim 2, wherein the insert-receiving pocket includes an internally threaded hole for receiving a threaded clamping screw, a head of the clamping screw defining the clamp surface.

4. The cutting tool as set forth in claim 3, wherein the clamping screw head defines a substantially truncated cone shape.

5. The cutting tool as set forth in claim 3, wherein the clamping screw head defines a substantially spherical shape.

6. The cutting tool as set forth in claim 3, wherein an axis of the internally threaded hole defines a non-zero angle with an axis of the clamping hole when the two side abutment surfaces and the insert supporting surfaces are secured in the contacting relationship.

7. The cutting tool as set forth in claim 3, wherein the clamping screw head is substantially circular in cross-section.

8. The cutting tool as set forth in claim 1, wherein the clamp is adapted to move to a clamping position relative to the toolholder and the cutting insert in which clamping forces at the two contact points urge the two of the plurality of insert supporting surfaces of the cutting insert against the two insert abutment surfaces of the insert-receiving pocket.

9. The cutting tool as set forth in claim 1, wherein the two insert abutment surfaces and the plurality of insert supporting surfaces define non-zero angles with an axis of the clamping hole when the two side abutment surfaces and the two of the plurality of insert supporting surfaces are secured in a contacting relationship.

10. The cutting tool as set forth in claim 9, wherein the non-zero angle defined by the plurality of insert supporting surfaces with the axis of the clamping hole is different than the non-zero angle defined by the two side abutment surfaces.

11. The cutting tool as set forth in claim 1, wherein at least one of the plurality of insert supporting surfaces and the two the side abutment surfaces includes a recess formed therein such that the plurality of insert supporting surfaces and the two side abutment surfaces contact each other at least at two discrete points when in the contacting relationship.

\* \* \* \* \*